United States Patent [19]

Sawada

[11] Patent Number: 4,798,496

[45] Date of Patent: Jan. 17, 1989

[54] UNDERGROUND TANK WITH LEAK DETECTION MECHANISM

[75] Inventor: Koji Sawada, Tokyo, Japan

[73] Assignee: Nippon Engineer Service Kabushiki Kaisha, Tokyo, Japan

[21] Appl. No.: 91,037

[22] Filed: Aug. 31, 1987

[30] Foreign Application Priority Data

Feb. 10, 1987 [JP] Japan .................. 62-27098
May 13, 1987 [JP] Japan .................. 62-114873

[51] Int. Cl.⁴ .............................. B65G 5/00
[52] U.S. Cl. .................... 405/53; 73/49.2; 405/52; 405/128
[58] Field of Search ............ 73/49.2 T; 405/58, 52, 405/53, 128, 129

[56] References Cited

U.S. PATENT DOCUMENTS

| | | | |
|---|---|---|---|
| 3,848,765 | 11/1974 | Durkop | 73/49.2 T X |
| 3,995,472 | 12/1976 | Murray | 73/49.2 T X |
| 4,537,328 | 8/1985 | Keesee et al. | 73/49.2 T X |
| 4,638,920 | 1/1987 | Goodhues | 73/49.2 T X |
| 4,653,312 | 3/1987 | Sharp | 73/49.2 T |
| 4,672,366 | 6/1987 | Butts | 73/49.2 T X |
| 4,676,093 | 6/1987 | Pugnale et al. | 73/49.2 T |
| 4,708,015 | 11/1987 | Sharp | 73/49.2 T |

FOREIGN PATENT DOCUMENTS 428341 7/1967 Switzerland .................. 73/49.3

Primary Examiner—Dennis L. Taylor
Attorney, Agent, or Firm—James E. Nilles; Thomas F. Kirby

[57] ABSTRACT

An underground tank having a leak detection mechanism, wherein a narrow gap is provided between an inner tank in which a liquid is to be contained and an outer tank covering the inner tank, a conduit is opened into the gap and a float is provided in the conduit, so that a leak of tank can be detected from the position of the float. A thin sheet is wound on the outside surface of the inner tank so that the narrow gap is defined between the inner tank and the outer tank.

4 Claims, 2 Drawing Sheets

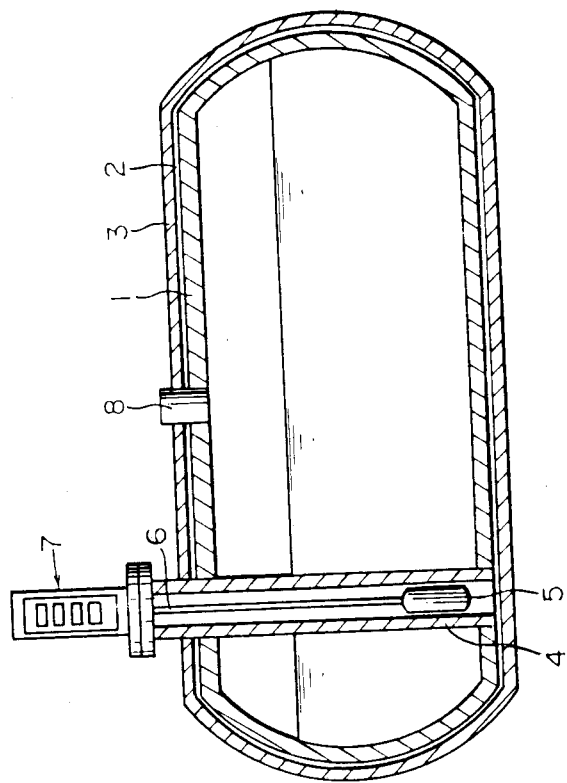
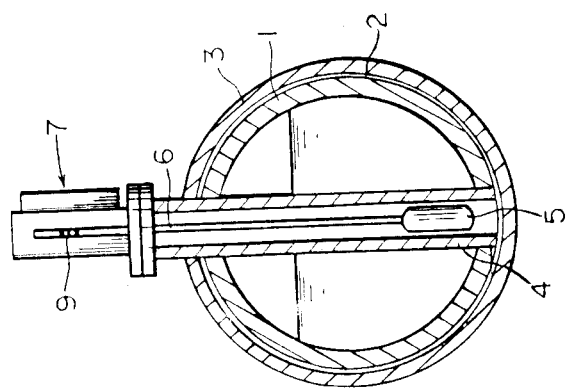

UNDERGROUND TANK WITH LEAK DETECTION MECHANISM

BACKGROUND OF THE INVENTION

1. Field of the Invention

The present invention relates to an underground tank having a leak detection mechanism, and particularly relates to an underground tank having a mechanism for detecting the leak of a contained substance such as gasoline.

2. Description of the Prior Art

Since a conventional underground tank for oil such as gasoline at an oil handling facility such as a filling station is made of steel in accordance with the Fire Services Act, the underground tank is likely to corrode and the tank portion right under an oil pouring port is likely to be holed (eroded).

Even if the outside surface of the conventional underground tank is coated with a bituminous substance such as coal tar for rust prevention, the coating layer of the bituminous substance is dissolved by oil permeating through the ground from the surface thereof, so that the outside surface of the tank is likely to corrode.

It is not easy to find out whether the underground tank is holed or not.

SUMMARY OF THE INVENTION

It is an object of the present invention to provide an underground tank which can eliminate the above-mentioned drawbacks of the conventional underground tank.

It is another object of the present invention to provide an underground tank having a leak detection mechanism and comprising an inner tank in which a liquid is to be contained, an outer tank covering the inner tank with a narrow gap therebetween, a conduit extending down through the inner and the outer tanks and opened into the gap at the bottoms of both the tanks, a float disposed in the conduit, and a means for detecting the position of the float.

It is another object of the present invention to provide an underground tank having a leak detection mechanism and comprising an inner tank in which a liquid is to be contained, an outer tank covering the inner tank, a thin sheet wound on the outside surface of the inner tank so that a narrow gap is defined between both the inner and the outer tanks, a conduit extending down through the inner and the outer tanks and opened into the gap at the bottoms of both the tanks, a float disposed in the conduit, and a float position detection means.

It is still another object of the present invention to provide an underground tank having a leak detection mechanism and comprising an inner tank in which is liquid is to be contained, an outer tank covering the inner tank with a narrow gap therebetween, a conduit opened into the gap, a means for introducing a liquid into the gap through the conduit, and a means for detecting the change in the level of the liquid in the conduit.

According to the present invention the leak of the liquid out of each of the above-described underground tanks having the leak detection mechanisms can be very easily detected.

The other object and feature of the present invention are hereinafter described with reference to the drawings attached hereto.

BRIEF DESCRIPTION OF THE DRAWINGS

FIG. 1 shows a cross-sectional view of an underground tank of an embodiment of the present invention which has a leak detection mechanism;

FIG. 2 shows a longitudinally sectional view of the underground tank shown in FIG. 1;

DESCRIPTION OF THE PREFERRED EMBODIMENTS

Figure 4:
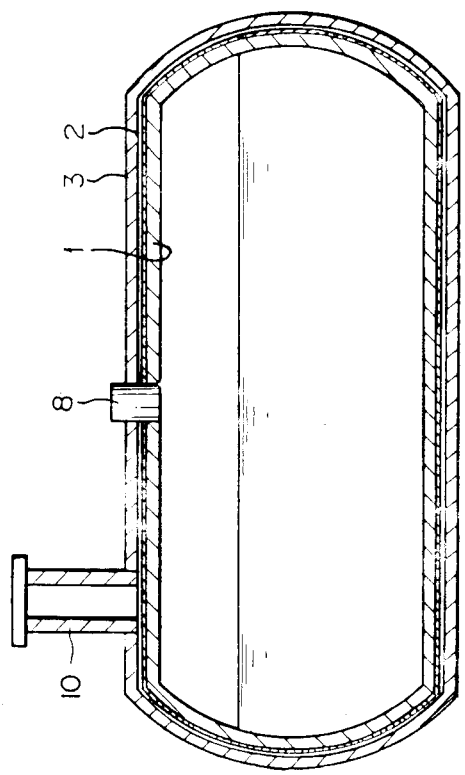
FIG. 4 shows a longitudinally sectional view of the underground tank shown in FIG. 3.

FIGS. 1 and 2 show a first embodiment of the present invention in which an inner cylindrical tank 1 made of steel and having an inside diameter of about 2 m, a length of about 6 m and a thickness of about 6 mm is covered with an outer tank 3 made of fiberglass-reinforced plastic and having a thickness of about 3 mm, so that a gap 2 of about 0.2 mm is defined between both the tanks. A steel conduit 4 having an outer diameter of about 80 mm and a thickness of about 6 mm extends down liquid-tightly through the inner and the outer tanks 1 and 3 and is opened into the gap 2 at the bottoms of both the tanks. A float 5 made of an oil-resisting resin having a smaller specific gravity than oil is inserted in the conduit 4. A rod 6 is secured to the top of the float 5 and extends upward. A means 7 for detecting the position of the float 5 is provided at the upper portion of the rod 6. A socket 8 having an oil pouring port, an air hole and so forth is provided on the upper portion of the inner tank 1 through the outer tank 3.

A method of defining the gap 2 between the inner and the outer tanks 1 and 3 is that a plurality of projections each having a height of about 0.2 mm are provided on the outside surface of the inner tank 1, and the outer tank 3 split in two parts is then provided around the projections.

Another method of defining the gap 2 between the inner and the outer tanks 1 and 3 is that a polyvinylidene chloride sheet having a thickness of about 0.2 mm and being reticulate or the like is intermittently or densely wound on the outside surface of the inner tank 1, a fiberglass fabric is densely wound on the sheet, and an unsaturated polyester is applied to the fiberglass fabric. In this method, the unsaturated polyester permeates into the fiberglass fabric so that they spontaneously harden to constitute the outer tank 3. The polyvinylidene chloride sheet has openings which have a thickness of about 0.2 mm and constitute the gap 2.

The position detection means 7 is a conventional means such as an electromagnetic pickup means comprising a magnetic body or magnet 9 provided on the upper portion of the rod 6, and an electromagnetic coil (not shown in the drawings) provided on the upper portion of the conduit 4, and a visual observation means comprising a graduation provided on the upper portion of the rod 6, and an observation window provided in the upper portion of the conduit 4.

If a liquid leaks out of the inner tank 1, the liquid flows into the conduit 4 through the gap 2 so that the float 5 is pushed up as the quantity of the leaking liquid increases. The change in the position of the float 5 is found out by the position detection means 7. Therefore, the leak of the liquid can be detected.

Figure 3:
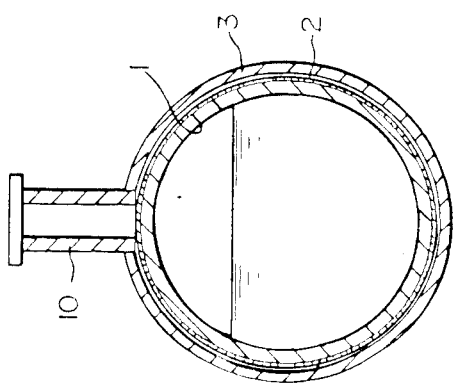
FIG. 3 shows a cross-sectional view of an underground tank of another embodiment of the present invention which has a leak detection mechanism.

FIGS. 3 and 4 show the second embodiment in which a steel conduit 10 having an outer diameter of about 80 mm and a thickness of about 6 mm extends down airtightly through the outer tank 3 and is opened into the gap 2 between the outer tank 3 and the inner tank 1. A liquid such as water is filled into the gap 2 through the conduit 10. A means such as an observation window is provided to detect the level of the liquid in the conduit 10.

If a leak occurs in the inner tank 1, the liquid in the conduit 10 and the gap 2 flows into the inner tank 1 so that the level of the liquid in the conduit 10 drops. The drop is found out to detect the leak of the inner tank 1.

The level of the liquid in the conduit 10 drops at the time of a leak out of the outer tank 3 as well. If it is found out whether the level of the substance contained in the inner tank 1 goes up or not, it can be judged whether the leak has occurred out of the inner tank 1 or out of the outer tank 3.

What is claimed is:

1. An underground tank assembly and a leak detection mechanism therefor, said tank assembly comprising an inner tank in which a liquid is to be contained but which is susceptible to leakage; an outer tank covering said inner tank with a narrow gap therebetween, each of the tanks comprising an upper side and a lower side, and a first conduit (8) defining a fill port for said inner tank extending through said outer tank and said inner tank and through said gap therebetween; said leak detection mechanism comprising a second conduit (4) extending down through said upper sides of said outer tank and said inner tank and through said gap therebetween, through said inner tank and through said lower side of said inner tank and opened into said gap between said inner tank and said outer tank; a float provided in said second conduit (4) responsive to the level of any leaked liquid which has flowed into said second conduit (4) from said gap; and means in said second conduit (4) for detecting the position of said float to thereby provide an indication of leakage of liquid from said inner tank.

2. An underground tank assembly according to claim 1 wherein each of the tanks has an inside surface and an outside surface and wherein said tank assembly further comprises means on the outside surface of said inner tank for engaging the inside surface of said outer tank for maintaining said gap.

3. An underground tank assembly according to claim 2 wherein said means on the outside surface of said inner tank comprises a thin sheet having openings therein and wound on said inner tank.

4. An underground tank assembly according to claim 3 wherein said inner tank is metal, wherein said thin sheet is polyvinyl chloride and wherein said outer tank is fiberglass reinforced plastic.

* * * * *